United States Patent [19]

Arai et al.

[11] Patent Number: 5,244,318
[45] Date of Patent: Sep. 14, 1993

[54] THROWAWAY INSERT AND CUTTING TOOL THEREFOR

[75] Inventors: Tatsuo Arai; Takayoshi Saito, both of Tokyo, Japan

[73] Assignee: Mitsubishi Materials Corporation, Tokyo, Japan

[21] Appl. No.: 725,829

[22] Filed: Jul. 3, 1991

[30] Foreign Application Priority Data

Jul. 4, 1990 [JP] Japan .................................. 2-176967
Mar. 8, 1991 [JP] Japan .................................. 3-043876

[51] Int. Cl.$^5$ .............................................. B23C 5/20
[52] U.S. Cl. ...................................... 407/42; 407/113
[58] Field of Search .................. 407/113, 42, 61, 114, 407/115, 120

[56] References Cited

U.S. PATENT DOCUMENTS

| 4,278,373 | 7/1981 | Wolfe, III ........................... | 407/114 |
| 4,297,058 | 10/1981 | Armbrust et al. .................. | 407/113 |
| 4,585,375 | 4/1986 | Erkfritz ............................... | 407/114 |
| 4,844,669 | 7/1989 | Tsujimura et al. .................. | 408/713 |
| 4,930,945 | 6/1990 | Arai et al. ........................... | 407/113 |
| 4,934,878 | 6/1990 | Plutschuck et al. ................ | 407/113 |
| 5,020,944 | 6/1991 | Pawlik ................................ | 407/113 |

FOREIGN PATENT DOCUMENTS

2307229 8/1973 Fed. Rep. of Germany ...... 407/114

*Primary Examiner*—Steven C. Bishop
*Attorney, Agent, or Firm*—Cushman, Darby & Cushman

[57] ABSTRACT

According to a first embodiment of the present invention, an insert of a multilateral-shaped configuration comprising a rake face adjoining a major cutting edge has the rake face formed so as to comprise a plurality of laterally disposed rake face elements disposed substantially along the major cutting edge and intersecting with each other. The adjoining laterally disposed rake face elements form a ridge which has a convex cross-section and extends to each corresponding major cutting edge. The laterally disposed rake face elements are formed so that the plane angle of each of the laterally disposed rake face elements of one of the rake faces having one of the major faces adjoining the major cutting edge is different from the corresponding plane angle of the other laterally disposed rake face elements of the rake face. Furthermore, according to a second embodiment of the present invention, an insert has two rake face elements in a cascade which comprise a first rake face element having a 90-degree plane angle and adjoining the major cutting edge, and a second rake face element having a less-than-90-degrees plane angle and adjoining the first rake face element and extending opposite from the major cutting edge. A cutting tool adapted for mounting the insert of the second embodiment is also disclosed as an embodiment of the present invention.

11 Claims, 13 Drawing Sheets

THROWAWAY INSERT AND CUTTING TOOL THEREFOR

BACKGROUND OF INVENTION

The present invention relates to a throwaway tip or insert adapted to be releasably mounted on a tool body for cutting tools, such as face cutters, and more particularly to a throwaway insert adapted to be mounted on the tool body so that either of the first (or upper) and second (or lower) major faces of the insert disposed in parallel and opposite to each other is located so as to constitute a flank which faces toward the external circumference of the tool body. The present invention further relates to a cutting tool with the above mentioned throwaway inserts attached thereto.

In the art of conventional cutting tools such as face cutters, a so-called vertical cutting edge type cutting tool is well known in which throwaway inserts are mounted on the tool body so that either of the upper and lower major faces of the insert, disposed in parallel and opposite to each other, is located so as to constitute a flank which faces toward the external circumference of the tool body.

An insert adapted for such a vertical cutting edge type cutting tool is disclosed in Japanese Unexamined Patent Publication JA-A-85790, as shown in FIGS. 34 to 36.

The disclosed insert has a rhombus-shaped flat plate configuration and comprises first and second rhombus-shaped major faces 1 and 2 disposed parallel and opposite to each other; a first pair of oppositely facing side faces 3a, 3a extending between the two opposite side margins of the first major face 1 and two opposite side margins of the second major face 2; and a remaining second pair of oppositely facing side faces 3b, 3b extending between remaining two side margins of the first major face 1 and remaining two side margins of the second major face 2. The major faces 1 and 2 have acute angle ($\theta$) corners C1, C1 and obtuse angle corners C2, C2.

A first pair of major cutting edges 4, 4 and a second pair of major cutting edges 5, 5 are respectively constituted along each of the intersections of the first major face 1 with each of the first pair of side faces 3a, 3a, and the intersections of the second major face 2 with the second pair of side faces 3b, 3b. Rake faces 3a, 3a, 3b, 3b are respectively constituted on and represented by each of the side faces 3a, 3a, 3b, 3b adjoining said main cutting edge 4, 4, 5, 5. The rake faces 3a, 3a, 3b, 3b have an acute angle $\phi$ with the corresponding major face thereof.

Minor flanks 6, 6, 7, 7 are respectively formed along each of the intersections of the side faces 3b, 3b, 3a, 3a with the first and second major faces 1, 2 where the intersection does not constitute a major cutting edge. The minor flanks 6, 6, 7, 7 have one narrower end thereof intersecting with the rake faces 3a, 3a, 3b, 3b adjoining the major cutting edges 4, 4, 5, 5. Also, minor cutting edges 8, 8, 9, 9 are respectively constituted along the intersections of the minor flanks 6, 6, 7, 7 with the rake faces 3a, 3a, 3b, 3b.

As shown in FIGS. 37, 38, the insert 10 formed as above is mounted on a mounting seat 12 disposed on an external circumference at the front end of a tool body 11 having a substantially circular configuration. The insert 10 is selectively located on the mounting seat so that either of the first or second major faces 1, 2 is positioned to constitute a flank which faces toward the external circumference of the tool body 11, and one of the acute angle corner, C1, protrudes toward the front side of the tool body 11. In FIGS. 37, 38 the first or upper major face 1 is selected to be the flank, and the second or lower major face 2 is subsequently seated on the mounting seat 12, and one of the side faces 3a constitutes a rake face facing toward the direction of rotation of the tool body 11. After being so seated, the insert is clamped to the mounting seat 12 by means of a clamping screw. In operation, as the tool body 11 rotates around the axis of rotation thereof with the insert so mounted, one of the first pair of major cutting edges 4 adjoining the so selected rake face 3a and a corresponding one of the minor cutting edges 8, 8, 9, 9 proceed to the cutting of a work-to-be-machined (not shown). In the case shown in FIGS. 37, 38, the first major face 1 serving as the flank facing toward the external circumference of the tool body 11 has a relief angle $\tau$ with respect to the external circumference, and the rake face 3a facing toward the direction of rotation of the tool body 11 has a positive radial rake angle $\beta$ and a positive axial rake angle $\alpha$. In turn, the side face 3b which adjoins the rake face 3a at the acute angle corner C1 has a positive relief angle $\delta$.

The insert 10 may be selected to be seated on the second major face contacting the mounting seat 12 but with the other of the first pair of major cutting edges 4 positioned for cutting by turning the insert 10 by 180 degrees. Furthermore, the insert 10 may be selected to be seated on the first major face 1 contacting the mounting seat 12, whereby either of the second major cutting edges 5, 5 is positioned for cutting. Consequently, the four major cutting edges 4, 4, 5, 5 and the four minor cutting edges 6, 6, 7, 7 may be subjected to the use for cutting by appropriately selecting the attitude of the insert 10.

The conventional insert described above has a disadvantage. With respect to the conventional insert, it is known that, increasing the axial rake angle $\alpha$ and the radial rake angle $\beta$ of the major cutting edges 4, 5 when mounting on the tool body 11 is an effective method to improve machineability by reducing the cutting resistance subjected to the major cutting edges 4, 5.

However, the conventional insert has the rake faces 3a, 3b thereof formed to have a single slant face of a constant plane angle $\phi$ with the first and second major faces from the acute, angle corner C1 to the obtuse angle corner C2. Accordingly, in order to increase the axial rake angle $\alpha$ of the major cutting edges 4, 5 as discussed above, the vertex angle $\theta$ of the acute angle corner, or the plane angle between the rake faces 3a and 3b must be decreased, thereby decreasing the strength of the cutting edge tip at the acute angle corner C1 and tending to cause a possible breaking in the edge. Increasing the radial rake angle $\beta$ also involves a decrease in the included angle of the major cutting edges 4, 5 which is identical to the plane angle $\phi$ discussed above, again causing a possible decrease in the cutting edge strength.

The conventional insert also has another disadvantage. The strength and rigidity of the major cutting edge of the conventional insert is often found to be insufficient for machining hard material such as die steel and material having welded sections since, as discussed above, the rake angle is kept at a constant positive angle of less than 90 degrees and, subsequently the included angle of the major cutting edge is relatively small.

SUMMARY OF THE INVENTION

Therefore, an object of the present invention is to provide an insert that has an improved machineability without decreasing the strength and rigidity of the acute angle corner and the major cutting edge thereof as compared with the conventional insert.

Another object of the present invention is to provide an insert that has an appropriate strength and rigidity for machining hard material such as die steel and material having welded sections.

A further object of the present invention is to provide a cutting tool suitable for use with the insert of the present invention.

According to a first embodiment of the present invention, an insert of a multilateral-shaped configuration, comprising a rake face adjoining a major cutting edge, has the rake face formed so as to comprise a plurality of laterally disposed rake face elements disposed substantially along the major cutting edge and intersecting with each other. The adjoining laterally disposed rake face elements form a ridge which has a convex cross-section and extends to each corresponding major cutting edge. The laterally disposed rake face elements are formed so that the plane angle of each of the laterally disposed rake face elements of one of the rake faces having one of the major faces adjoining the major cutting edge is different from the corresponding plane angle of the other laterally disposed rake face elements of the rake face.

Furthermore, according to a second embodiment of the present invention, an insert of a multilateral-shaped configuration, comprising a rake face adjoining a major cutting edge, has the rake face formed so as to have two rake face elements in a cascade which comprise a first rake face element adjoining the major cutting edge and a second rake face element adjoining the first rake face element and extending opposite from the major cutting edge. The first rake face element has a plane angle of 90 degrees thereof with the major face adjoining said major cutting edge, and the second rake face element has a plane angle of less than 90 degrees thereof with the major face adjoining the major cutting edge.

Again, according to the present invention, a cutting tool adapted for mounting the insert of the present invention has a plurality of mounting seats which comprise a bottom surface adapted to be in close contact with one of the major faces of the insert selected to face the bottom surface, and side walls intersecting with the bottom surface and adapted to abut the side faces of the insert. The side walls have a recess formed at a portion thereof adapted to be opposite to the rake face element of the insert having a plane angle of 90 degrees with the major face so that the recess retreats away from the insert mounted on the mounting seat.

According to the present invention, the insert may have an external configuration of a rhombus, square, rectangular, triangle, or any other shape coming within the scope of multilateral-shaped configuration.

Thus, in the insert of the present invention, a first embodiment has a rake face adjoining the major cutting edge formed to have a plurality of laterally disposed rake face elements, each having a convex ridge formed with a laterally adjoining rake face element, whereby the axial rake angle of the rake face element gradually increases along the adjoining rake face elements from the rake face element disposed at the front side of the tool body toward the rear. Since the plane angle of one of the laterally disposed rake face elements is arranged to be different from the others of the laterally disposed rake face elements, the radial rake angle of the rake face element also varies according to the position of the rake face element.

Therefore, in the case where the plane angle of the rake face element positioned on the front side of the tool body is selected to be smaller than the plane angle of the rake face element on the rear side, the radial rake angle of the major cutting edge becomes greater on the front side, thereby improving the cutting sharpness on the front side. The included angle of the major cutting edge also becomes greater on the rear side, thereby improving the cutting edge strength on the rear side.

In the contrary case, where the plane angle of the rake face element positioned on the front side of the tool body is selected to be greater than the plane angle of the rake face element on the rear side, the included angle of the major cutting edge becomes greater on the front side, thereby improving the cutting edge strength on the front side. At the same time the radial rake angle of the major cutting edge becomes greater on the rear side, improving cutting sharpness on the rear side.

Accordingly, the cutting resistance of the major cutting edge can be decreased as a whole by varying the plane angles of the rake face elements appropriately so that the radial and axial rake angles of the rake face are partially increased with the required strength of the major cutting edge maintained at the required portion.

Furthermore, in the insert of the present invention, a second embodiment has a rake face adjoining the major cutting edge formed so as to have two rake face elements in a cascade which is comprised of a first rake face element adjoining the major cutting edge and having a plane angle or included angle of 90 degrees, and a second rake face element adjoining the first rake face element and extending opposite from the major cutting edge and having a plane angle of less than 90 degrees. Thus, since the rake face according to the second embodiment of the present invention has a second rake face element having a plane angle of less than 90 degrees adjoining the rake face element of a 90 degrees rake angle, the strength of the cutting edge increases with the included angle increased to 90 degrees, and the cutting resistance of the major cutting edge as a whole decreases compared to the case of a rake face having a single rake angle of 90 degrees.

Still further, according to the present invention, a third embodiment has a cutting tool in which the side walls of the mounting seat have a recess formed away from the side face of the insert as described above. Accordingly, an insert of the present invention in which the rake face element adjoining the major face is formed to have a plane angle of less than 90 degrees can be seated on the bottom surface of the mounting seat without interference between the rake face of the insert and the side wall of the mounting seat of the tool body. The tool body, according to the present invention, can therefore be used compatibly with either insert regardless of existence of a rake face or rake face element adjoining the major cutting edge and having a rake angle of 90 degrees.

DESCRIPTION OF THE PREFERRED EMBODIMENTS OF THE INVENTION

Figure 1:
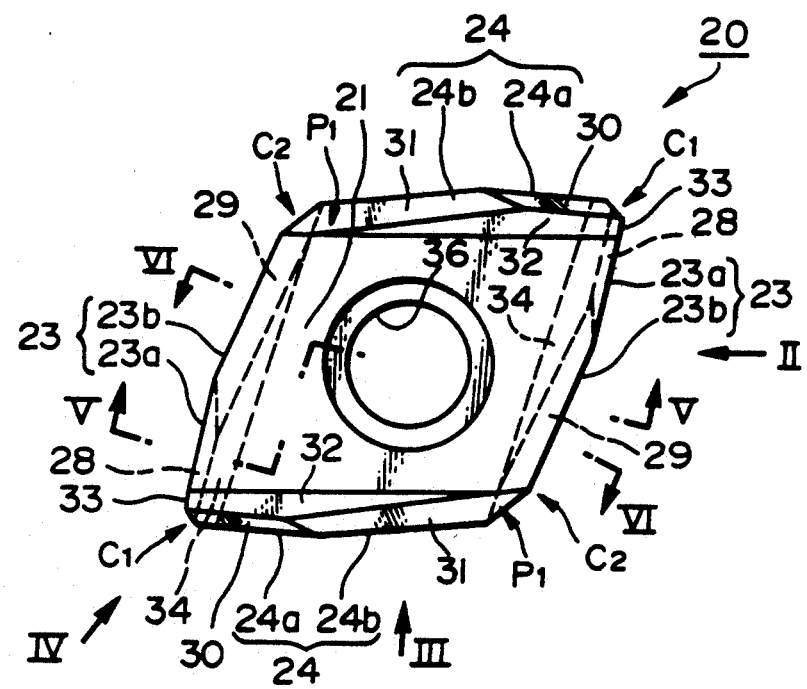
FIG. 1 is a plan view of a throwaway insert in accordance with a first embodiment of the present invention.

FIGS. 1 to 10 depict a throwaway insert in accordance with a first embodiment of the present invention. As shown in FIGS. 1 to 4, the insert 20 of the first embodiment is a cemented carbide block having a substantially rhombus-shaped flat plate configuration comprising a first (or upper) and second (or lower) rhombus-shaped major faces 21, 22 disposed parallel and opposite to each other, a first pair of oppositely facing side faces 25a, 25a extending between the two opposite side margins of the first major face 21 and the two opposite side margins of the second major face 22, and a remaining second pair of oppositely facing side faces 25b, 25b extending between the remaining two side margins of the first major face 21 and the remaining two side margins of the second major face 22.

A first pair of major cutting edges 23, 23 and a second pair of major cutting edges 24, 24 are respectively constituted along each of the intersections of the first major face 21 with each of the first pair of side faces 25a, 25a, and the intersections of the second major face 22 with the second pair of side faces 25b, 25b. Rake faces 26, 26, 27, 27 are respectively constituted on and represented by each of the side faces 25a, 25a, 25b, 25b, adjoining said main cutting edge 23, 23, 24, 24.

Minor flanks 32, 32, 34, 34 are respectively formed along each of the intersections of side faces 25b, 25b, 25a, 25a with the first and second major faces 21, 22 where the intersection does not constitute a major cutting edge. The minor flanks 32, 32, 34, 34 have one end thereof intersecting with the rake faces 26, 26, 27, 27 adjoining the major cutting edges 23, 23, 24, 24. Also, minor cutting edges 33, 33, 35, 35 are respectively constituted along the intersections of the minor flanks 32, 32, 34, 34 with the rake faces 26, 26, 27, 27.

Figure 2:
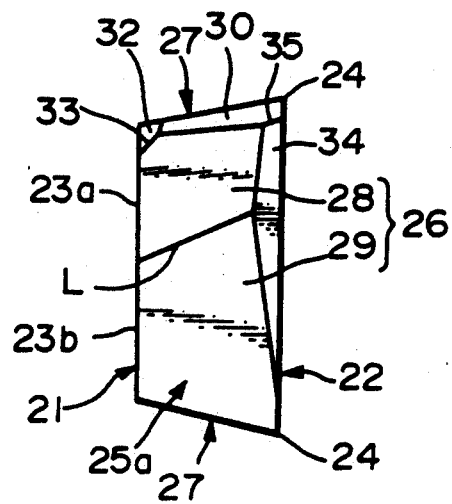
FIG. 2 is a side elevational view of the insert of FIG. 1 seen in the direction indicated by the arrow II in FIG. 1.
Figure 3:
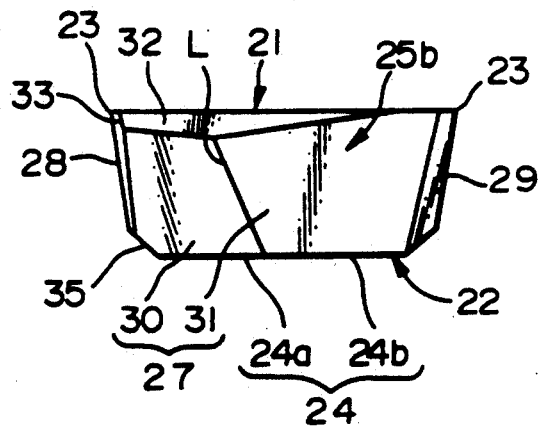
FIG. 3 is a side elevational view of the insert of FIG. 1 seen in the direction indicated by the arrow III in FIG. 1.
Figure 4:
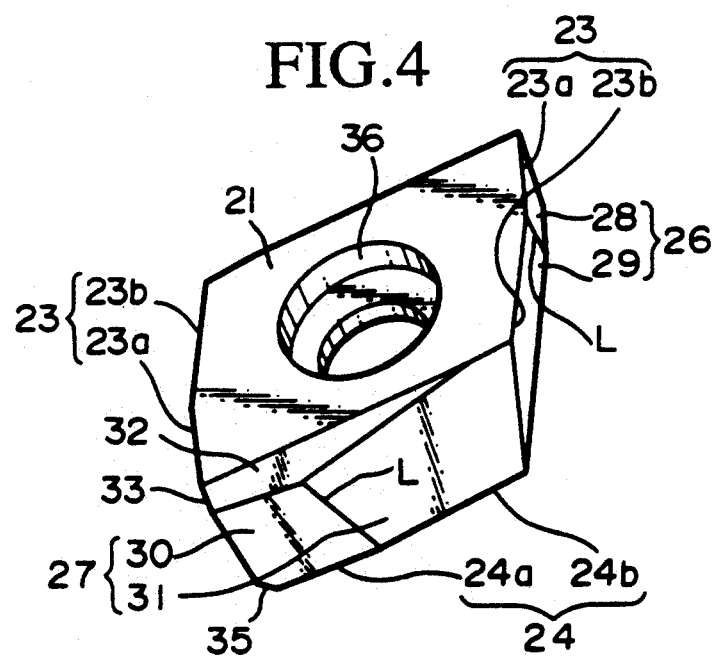
FIG. 4 is a perspective of the insert of FIG. 1 as seen in the direction indicated by the arrow IV in FIG. 1.

As shown in FIGS. 2 and 4, the rake face 26 adjoining the major cutting edge 23 is further formed so as to comprise a plurality, which is two in this embodiment, of laterally disposed rake face elements 28, 29 disposed substantially along the major cutting edge 23 and intersecting with each other to form a ridge L which has a convex cross-section and extends to the major cutting edge 23. The major cutting edge 23 is thereby divided into two major cutting edge elements 23a, 23b, in which the major cutting edge element 23a adjoins the acute angle corner C1 of the insert 20, and the major cutting edge element 23b adjoins the obtuse angle corner C2 of the insert 20, with both major cutting edge elements intersecting each other. The major cutting edge 24 is also divided into two major cutting edge elements 24a, 24b, in which the major cutting edge element 24a adjoins the acute angle corner C1 of the insert 20, and the major cutting edge element 24b adjoins the obtuse angle corner C2 of the insert 20.

Figure 5:
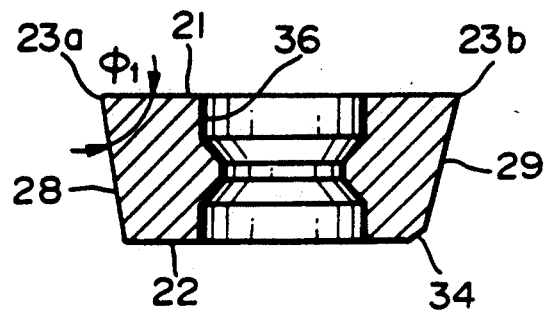
FIG. 5 is a cross-sectional view of the insert of FIG. 1 taken along the line V—V in FIG. 1.
Figure 6:
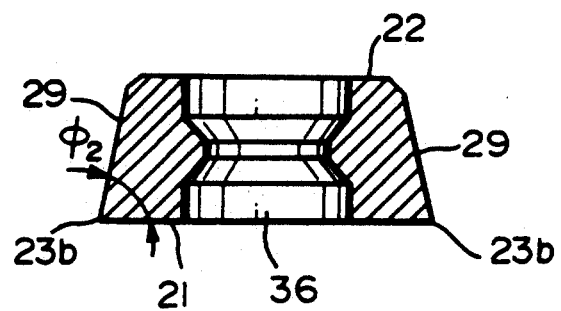
FIG. 6 is a cross-sectional view of the insert of FIG. 1 taken along the line VI—VI in FIG. 1.
Figure 7:
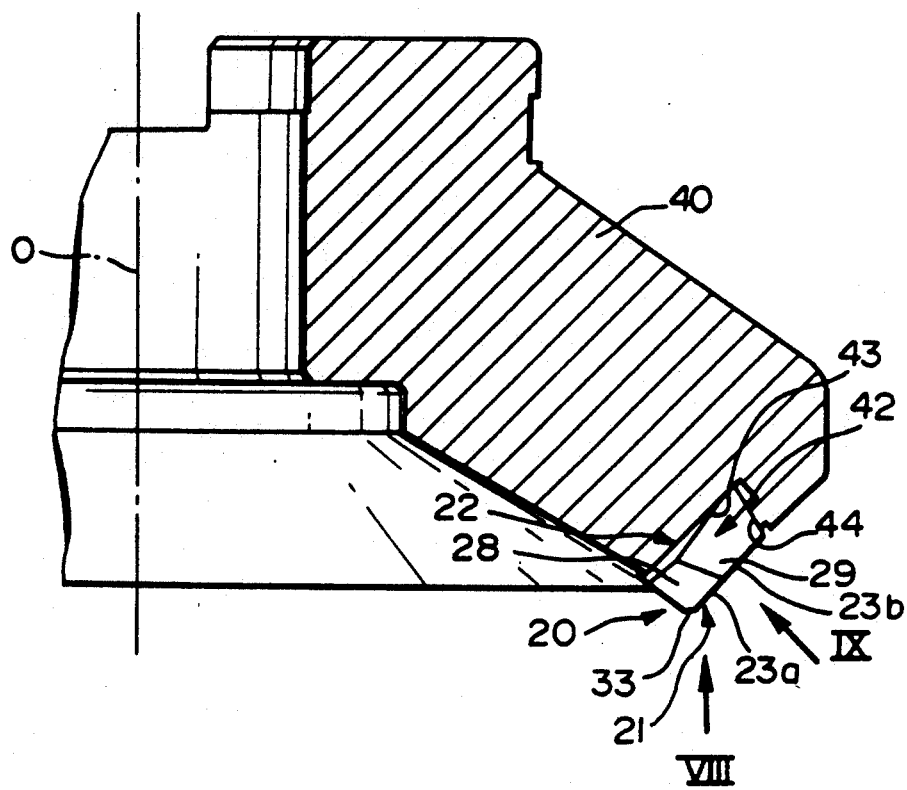
FIG. 7 is a cross-sectional view of a face milling cutter with the insert of FIG. 1 mounted on a mounting seat thereof.
Figure 8:
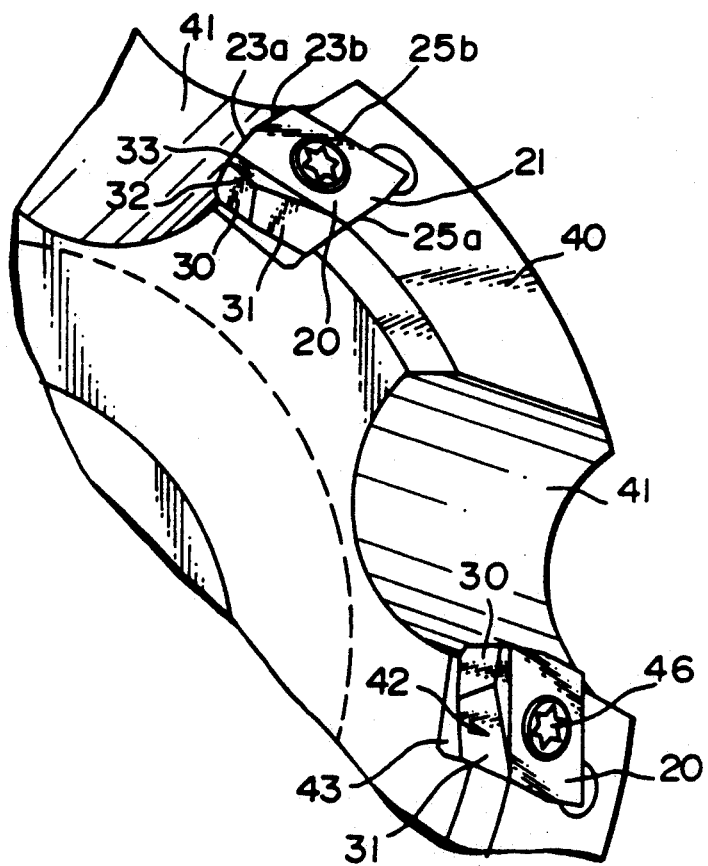
FIG. 8 is a partial front view of the cutter and the insert of FIG. 7 as seen in the direction indicated by the arrow VIII in FIG. 7.
Figure 9:
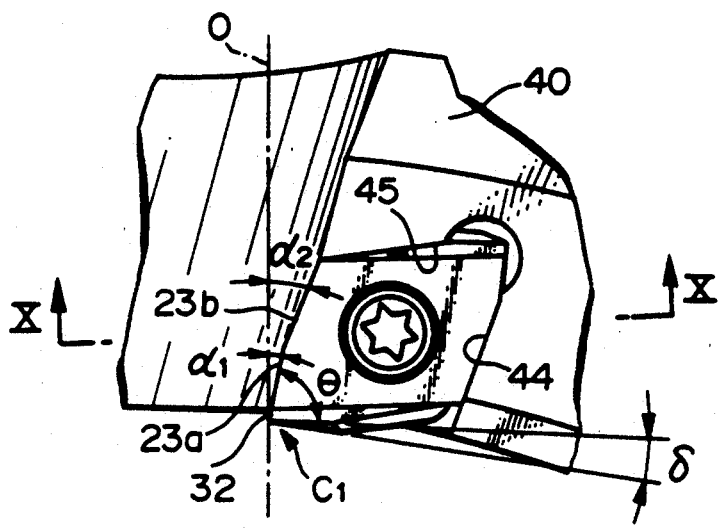
FIG. 9 is a partial side view of the cutter and the insert of FIG. 7 as seen in the direction indicated by the arrow IX in FIG. 7.

As shown in further detail in FIG. 5, the laterally disposed rake face element 28 adjoining the acute angle corner C1 has a plane angle $\phi_1$ with the adjoining first major face 21. The laterally disposed rake face element 30 adjoining the acute angle corner C1 also has a plane angle $\phi_1$ with the adjoining second major face 22 (not shown). Also as shown in further detail in FIG. 6, the laterally disposed rake face element 29 adjoining the obtuse angle corner C2 has a plane angle $\phi_2$ with the adjoining first major face 21. The laterally disposed rake face element 31 adjoining the obtuse angle corner C2 also has a plane angle $\phi_2$ with the adjoining second major face 22 (not shown). The plane angle $\phi_1$, an acute angle, of the rake face elements 28, 30 is arranged to be greater than the plane angle $\phi_2$, another acute angle, of the rake face elements 29, 31. Specifically, the plane angle $\phi_1$ is arranged to be 83 degrees, and the plane angle $\phi_2$ 79 degrees.

As shown in FIGS. 1 to 4, one end of the minor flank 32 opposed to the minor cutting edge 33 denoted as P1 is positioned at a predetermined distance away from the obtuse angle corner C2. The insert 20 is provided with a round hole 36 to insert a clamping screw through for clamping the insert to a tool body.

Referring to FIGS. 7 to 10, the configuration of a tool body 40, on which the insert 10 is adapted to be mounted, will be discussed hereupon. The tool body 40 has a substantially cylindrical shape in which a plurality of chip pockets 41, having openings to the front and to the external circumference are circumferentially disposed with a predetermined spacing at the front of the external circumference of the tool body 40. Disposed behind the chip pocket 41 in the direction of the rotation of the tool body 40 is an insert mounting seat 42 having an opening to the front and the external circumference of the tool body and to the chip pocket 41. The insert mounting seat 42 comprises a bottom or reference surface 43 facing the external circumference of the tool body 40, and side walls or abutment surfaces 44, 45 intersecting the reference surface 43 and respectively facing toward the direction of the rotation of the tool body 40 and toward the front end of the tool body 40.

The insert in accordance to the first embodiment of the present invention is located on the insert mounting seat 42 with either of the first or second major face 21, 22 in close contact with the reference surface 43 of the insert mounting seat 42 and with the two side faces 25a, 25b adjoining each other at the acute angle corner C1 abutted to the side wall or abutment surfaces 44, 45, whereby either of the major cutting edges 23, 24 and either of the rake face 26, 27 adjoining the major cutting edges are positioned to face toward the chip pocket 42, and the insert is clamped to the tool body by means of a clamping screw 46. As is easily understood from the above description, the insert may be selectively located with either of the first or second major face 21, 22 coming in contact with the bottom or reference surface 43, whereby one of the major cutting edges is selectively used for cutting. For the convenience of discussion, the second major face 22 is assumed to be faced to the reference surface 43 of the tool body 40.

Figure 10:
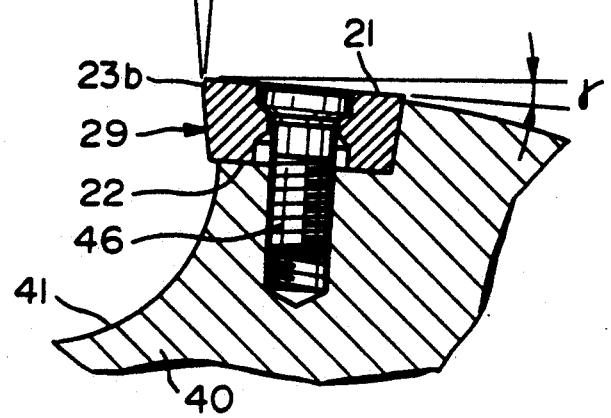
FIG. 10 is a partial cross-sectional view of the cutter and the insert of FIG. 7 taken along the line X—X in FIG. 7.
Figure 11:
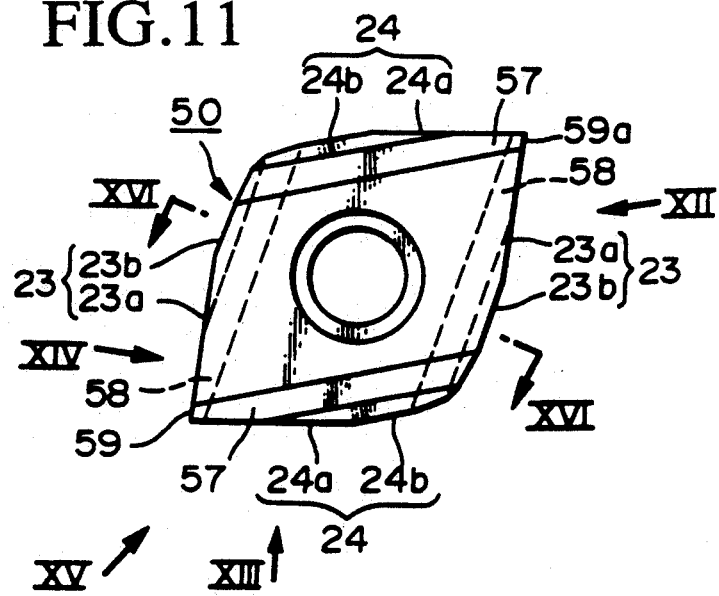
FIG. 11 is a plan view of a variation of the insert of FIG. 1.
Figure 12:
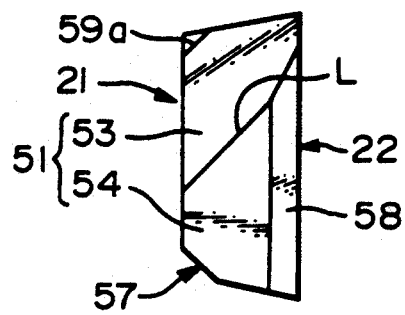
FIG. 12 is a side elevational view of the insert of FIG. 11 as seen in the direction indicated by the arrow XII in FIG. 11.
Figure 13:
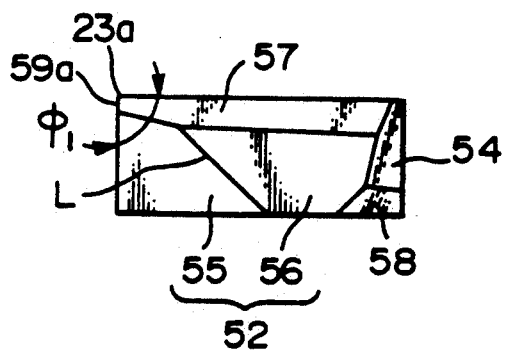
FIG. 13 is a side elevational view of the insert of FIG. 11 as seen in the direction indicated by the arrow XIII in FIG. 11.

When the insert 20 is mounted to the tool body 40, the first major face 21 facing toward the external circumference of the tool body 40 has a predetermined relief angle $\gamma$ with respect to the external circumference of the tool body 40, the rake face elements 28, 29 of the rake face 26 facing toward the chip pocket 41 have respectively positive axial rake angles $\alpha_1$, $\alpha_2$ and positive radial rake angles $\beta_1$, $\beta_2$. (Only $\beta_2$ is shown in FIG. 10.) The rake face 27 facing toward the front end of the tool body 40 has a predetermined positive relief angle $\delta$. Since the rake face elements 28 and 29 intersect each other forming the convex ridge, the axial rake angle $\alpha_2$ given to the rake face element 29 positioned toward the rear of the tool body 40 is greater than the axial rake angle $\alpha_1$ given to the rake face element 28 positioned toward the front of the tool body 40. Also, the radial rake angle $\beta_2$ given to the rake face element 29 is greater than the radial rake angle $\beta_1$ given to the rake face element 28 since the plane angle $\phi_2$ of the rake face element 29 with the first major face 21 is arranged to be smaller than the plane angle $\phi_1$ of the rake face element 28 with the first major face 21. This means $\beta_2$ is greater than $\beta_1$ because the smaller the plate angle $\phi_1$, $\phi_2$ is, the greater the radial rake angle, $\beta_1$, $\beta_2$ if the relief angle $\gamma$ of the first major face 21 is constant and because $\phi_2$ is smaller than $\phi_1$.

Therefore, in the case where the vertex angle $\theta$ of the insert 20 and the plate angle $\phi_1$ of the rake face element 28 with the first major face 21 are kept same as before and the axial rake angle $\alpha_1$ of the rake face element when mounted to the tool body 40 is also kept same as before, both the rake angles $\alpha_2$, $\beta_2$ of the rake face element 29 become greater toward the positive side. Accordingly, the cutting sharpness of the major cutting edge element 23b improves, and the cutting resistance of the rake face 23 decreases as a whole, resulting in a reduced power required for machining. In addition, the strength of the cutting edge on the acute angle corner C1 is not decreased since the included angle and the vertex angle $\theta$ are kept same as before on the side of the major cutting edge element 23a.

In the case where the plane angle $\phi_2$ of the rake face element 29 with the first major face 21 is kept same as before, both the vertex angle $\theta$ at the acute angle corner C1 and the plane angle $\phi_1$ of the rake face element 28 with the first major face 21 become greater than before, resulting in an increased strength of the cutting edge element 23a. In this case, if both the rake angles $\alpha_2$, $\beta_2$ of the rake face element 29 are kept same as before, both the rake angles $\alpha_1$, $\beta_1$ of the rake face element 28 along the major cutting edge element 23a increase. However, since the length of the major cutting edge element 23a is relatively short in this embodiment, the effect of the increase is limited within a scope where the depth of cut is very small in the axial direction of the tool and the cutting resistance subjected to the major cutting edge 23 as a whole is kept from an excessive increase.

With the insert 20 of this embodiment, the rake face 26 is bent at the intersecting ridge L of the rake face elements 28 and 29, whereby the cutting chip growing along the rake face 26 is bent at the ridge, resulting in a better ability to discharge the cutting chip and a subsequent decrease in the cutting resistance.

Figure 34:
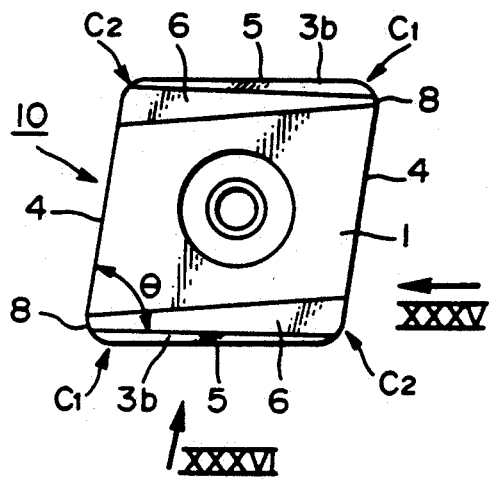
FIG. 34 is a plan view of a conventional throwaway insert.
Figure 35:
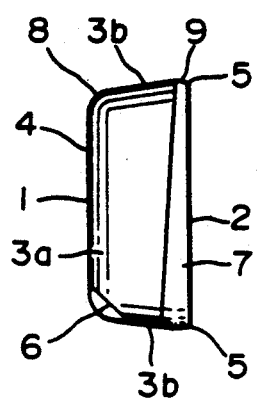
FIG. 35 is a side elevational view of the insert of FIG. 34 as seen in the direction indicated by the arrow XXXV in FIG. 34.
Figure 36:
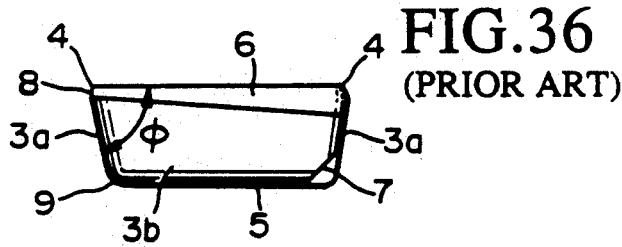
FIG. 36 is a side elevational view of the insert of FIG. 34 as seen in the direction indicated by the arrow XXXVI in FIG. 34.
Figure 37:
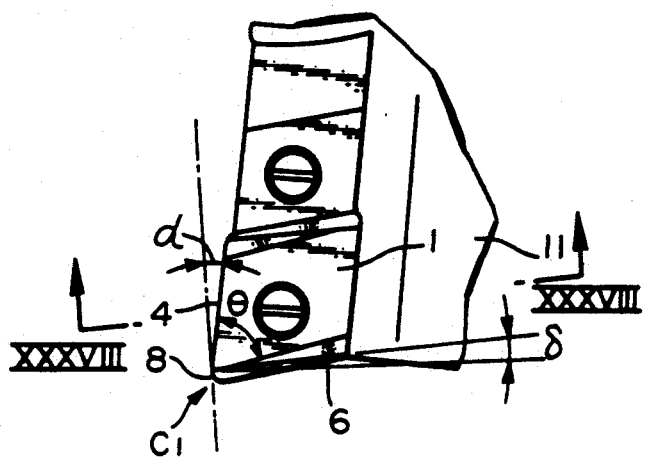
FIG 37 is an enlarged partial side view of a cutting tool at the front end of external circumference thereof with the insert of FIG. 34 mounted thereto.
Figure 38:
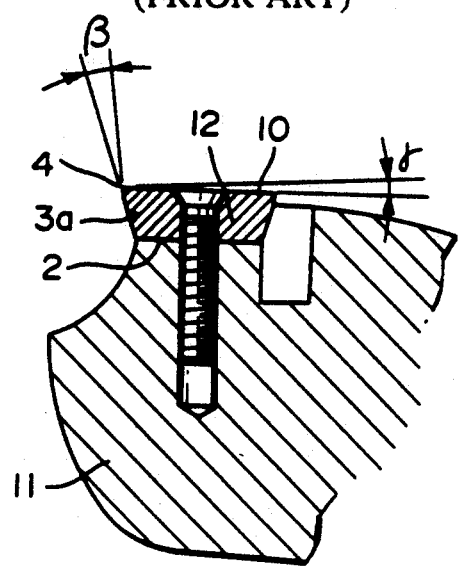
FIG. 38 is a radial cross-sectional view of the cutting tool and the insert of FIG. 37 taken along the line XXXVIII—XXXVIII in FIG. 37.

In addition, with the insert 20 of this embodiment, the end P1 of the minor flank 32 opposite to the minor cutting edge end is kept at or away from the obtuse angle corner C2, thereby the length of the major cutting edge 23 can be longer than before because of the lack of interference from the end P1 intersecting the major cutting edge, resulting in a desirable greater depth of cut in the axial direction of the tool than before. In the case of the conventional insert shown in FIG. 34, the minor flanks 6, 7 reach the obtuse angle corner C2 of the insert 10 and the width of the minor flank becomes wider toward the obtuse angle corner C2, resulting in a much shorter length of the major cutting edges 4, 5 than in the case of the insert 20 of this embodiment.

In the discussion above, the plane angle $\phi_1$ of the rake face elements 28, 30 of the rake face 26, 27 with the major faces 21, 22 is arranged to be greater than the plane angle $\phi_2$ of the rake face elements 29, 31 with the major faces 21. However, the present invention is not limited by this arrangement, and $\phi_2$ may be arranged to be greater than $\phi_1$. In this case, contrary to the above discussion, the radial rake angle $\beta_1$ of the rake face elements 28, 30 is greater than the radial rake angle $\beta_2$ of the rake face elements 30, 31, thereby the cutting sharpness increases during a cutting with a very small depth of cut in which only the major cutting edge elements 23b, 24b are used, and the included angle of the major cutting edge elements 23b, 24b increase, resulting in a limited breakage of the major cutting edge under heavy cutting with a large depth of cut.

In the discussion above, the plane angles $\phi_1$, $\phi_2$ of the rake face elements 28 to 31 with the major faces 21 or 22 is arranged to be less than 90 degrees. However, the present invention is not limited by this arrangement either. The insert 50 shown in FIGS. 11 to 16 has the rake faces 51, 52 adjoining the major cutting edges 23, 24 formed to comprise rake face elements 53 to 56. In this case, the plane angle $\phi_1$ of the rake face elements 53, 55 with the major face 21 or 22 is arranged to be 90 degrees, while the plane angle $\phi_2$ of the rake face elements 54, 56 with the major face 21 or 22 is arranged to be less than 90 degrees, specifically 79 degrees. In this case the strength of the major cutting edge elements 23a, 24a is greatly increased, resulting in a greatly limited breakage in the front side of the major cutting edges 23, 24. In addition, the radial rake angle of the rake face elements 54, 56 increases toward the positive side, whereby the cutting sharpness increases under a heavy cutting using the major cutting edge elements 23b, 24b, resulting in a reduced cutting power especially under a heavy cutting. Furthermore, since the included angle of the minor cutting edges 59a, 59b increases, a remarkable effect is produced on the prevention of breakage in the minor cutting edges 59a, 59b.

Figure 14:
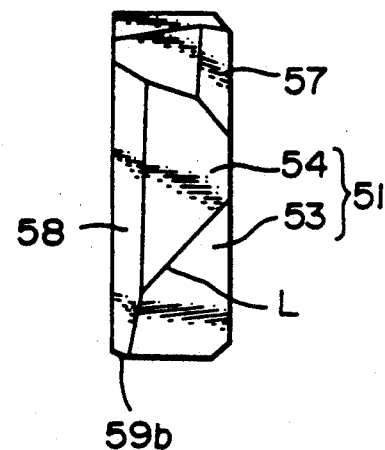
FIG. 14 is a side elevational view of the insert of FIG. 11 as seen in the direction indicated by the arrow XIV in FIG. 11.
Figure 15:
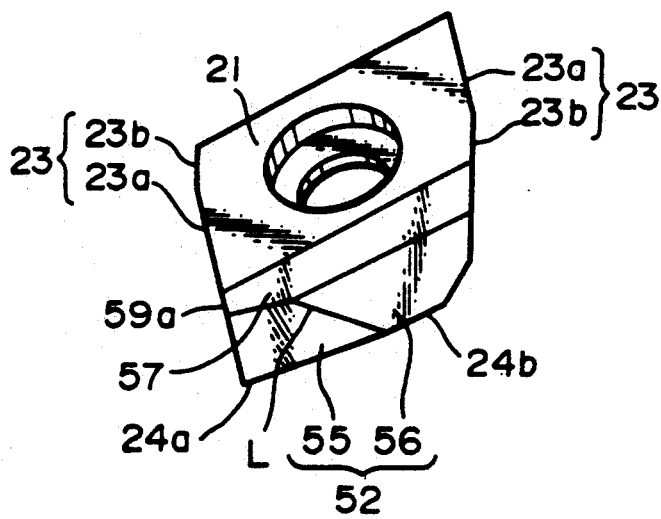
FIG. 15 is a perspective of the insert of FIG. 11 as seen in the direction indicated by the arrow XV in FIG. 11.
Figure 16:
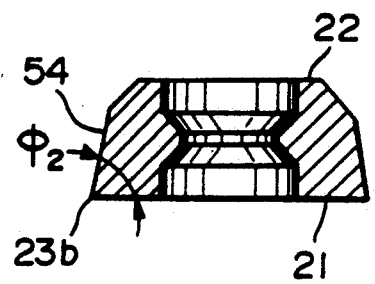
FIG. 16 is a cross-sectional view of the insert of FIG. 11 taken along the line XVI—XVI in FIG. 11.
Figure 17:
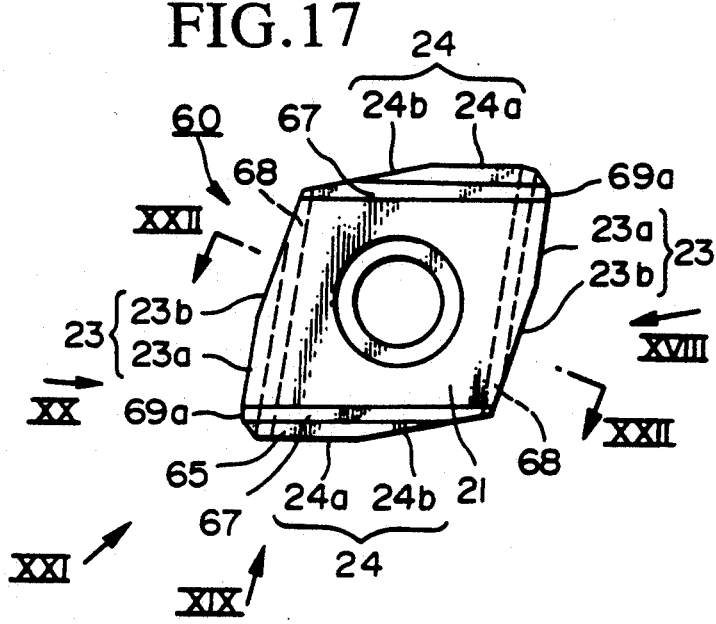
FIG. 17 is a plan view of another variation of the insert of FIG. 1.
Figure 18:
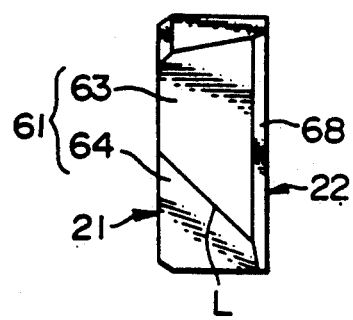
FIG. 18 is a side elevational view of the insert of FIG. 17 as seen in the direction indicated by the arrow XVIII in FIG. 17.
Figure 19:
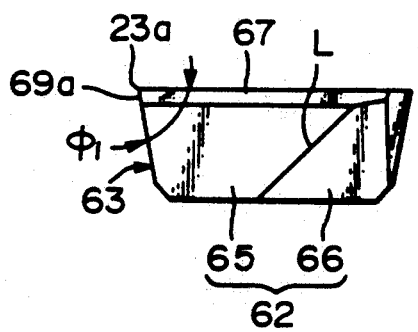
FIG. 19 is a side elevational view of the insert of FIG. 17 as seen in the direction indicated by the arrow XIX in FIG. 17.
Figure 20:
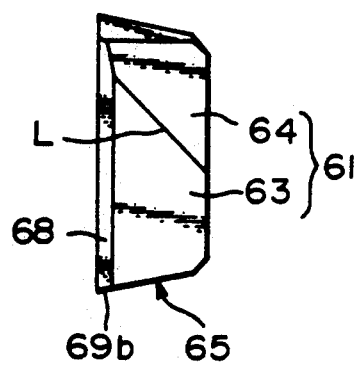
FIG. 20 is a side elevational view of the insert of FIG. 17 as seen in the direction indicated by the arrow XX in FIG. 17.
Figure 21:
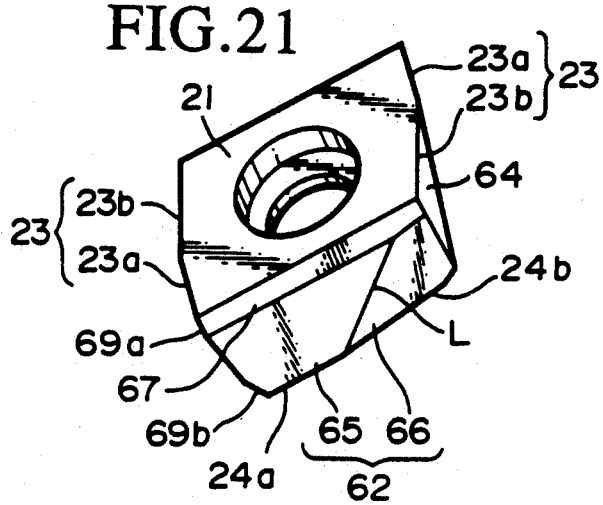
FIG. 21 is a perspective of the insert of FIG. 17 as seen in the direction indicated by the arrow XXI in FIG. 17.
Figure 22:
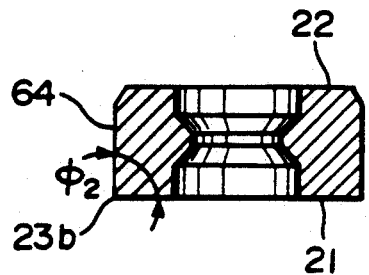
FIG. 22 is a cross-sectional view of the insert of FIG. 17 taken along the line XXII—XXII in FIG. 17.
Figure 23:
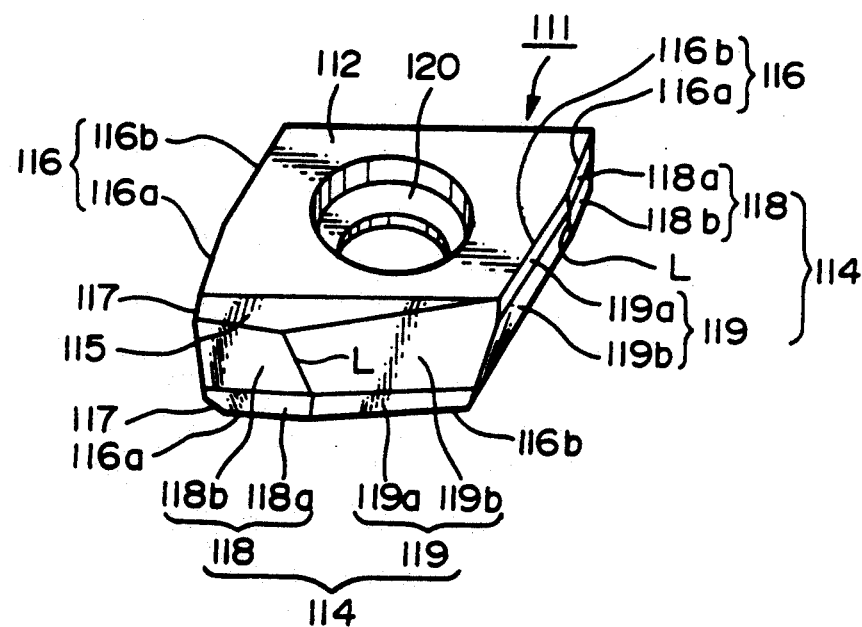
FIG. 23 is a perspective view of a throwaway insert in accordance with a second embodiment of the present invention.
Figure 24:
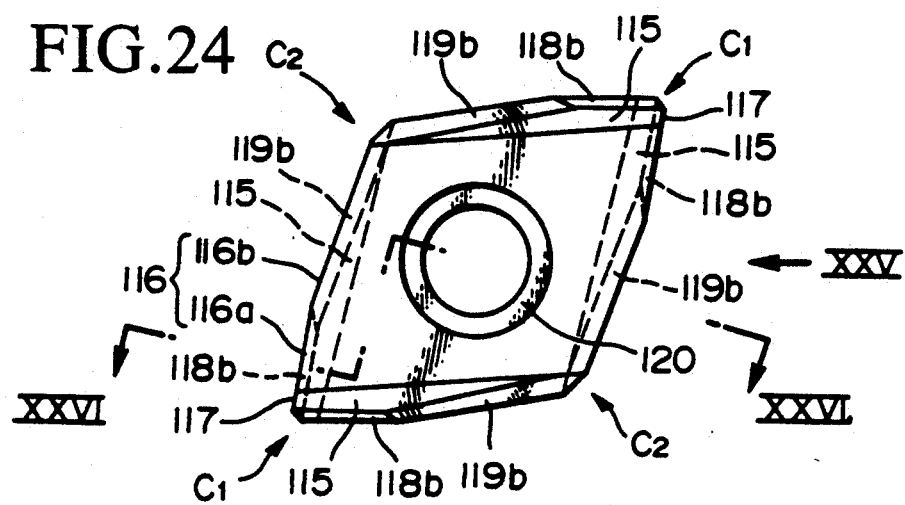
FIG. 24 is a plan view of the insert of FIG. 23.
Figure 25:
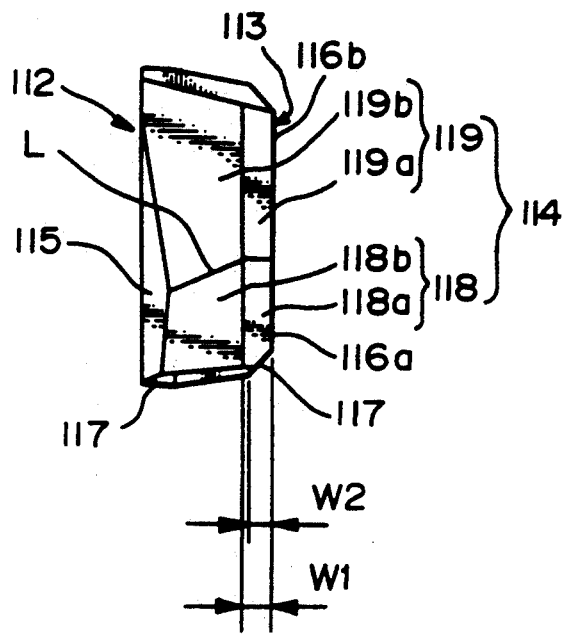
FIG. 25 is a side elevational view of the insert of FIG. 23 as seen in the direction indicated by the arrow XXV in FIG. 23.
Figure 26:
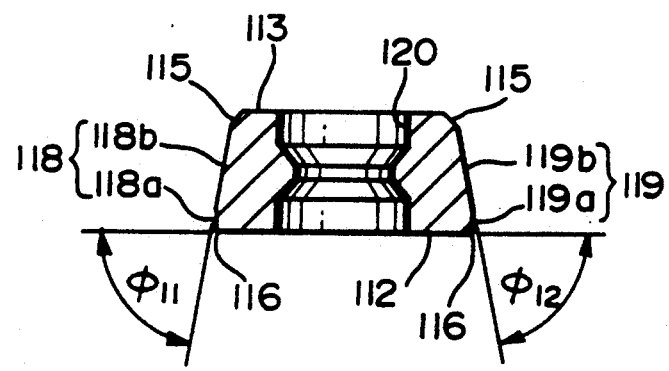
FIG. 26 is a cross-sectional view of the insert of FIG. 23 taken along the line XXVI—XXVI in FIG. 23.

Contrary to the insert 50 shown in FIGS. 14 to 16 above, the insert 60 shown in FIGS. 17 to 22 has an arrangement in which the plane angle $\phi_1$ of the rake face elements 63, 65 with the major face 21 or 22 is an acute angle of 79 degrees, while the plane angle $\phi_2$ of the rake face elements 64, 66 with the major face 21 or 22 is made 90 degrees. In this case, minor flanks 67, 68 and minor cutting edges 69a, 69b are formed.

In this arrangement, since the included angle of the major cutting edge elements 23b, 24b is greatly increased, a remarkable effect is produced on the prevention of breakage in the major cutting edges 23, 24 at the cutting of the black surface of steel and cast iron, and the heavy cutting of a material of substantial hardness.

In addition, with the inserts 50 and 60, one rake face element is arranged to have a plane angle of 90 degrees. Therefore, the 90-degree rake face elements have an improved closer contact with the side wall or abutment wall 44, 45 of the insert mounting seat 42 (FIGS. 7 to 10), resulting in a tighter clamping. The matching of the side wall becomes easier because of a right angle with the bottom or reference surface of the insert mounting seat.

Now, referring to FIGS. 23 to 26 a throwaway insert 111 in accordance with a second embodiment of the present invention will be described. The insert 111 has a similar configuration to the insert of the first embodiment discussed above, in which the insert 111 has a rhombus-shaped flat plate configuration comprising a first and second major faces 112, 113, disposed parallel and opposite to each other, four side faces 114, four major cutting edges 116, each comprising two laterally disposed major cutting edge elements 116a, 116b, four minor flanks 115, and four minor cutting edges 117. A rake face 114 is constituted on each of the side faces 114 and comprises a plurality of laterally disposed rake face elements 118 and 119.

The insert 111 according to this second embodiment of the present invention is characterized in that the laterally disposed rake face elements 118, 119 adjoining the major cutting edge 116a, 116b comprise first and second rake face elements respectively in a cascade in the direction from the first major face 112 toward the second major face 113 so that the rake face 114 comprises two first rake face elements 118a, 119a adjoining the major cutting edge 116a, 116b and two second rake face elements 118b, 119b adjoining the first rake face elements 118a, 119a and extending opposite from the major cutting edge 116. The first rake face elements 118a, 119a have a plane angle of 90 degrees thereof with the first major face 112 adjoining said major cutting edge 116a, 116b, and the second rake face elements 118b, 119b have a plane angle of less than 90 degrees thereof with the first major face 112 adjoining the major cutting edge 116a, 116b. The first rake face elements 118a, 119a have a same and constant width W1 along a full length of the major cutting edge elements 116a, 116b. The width W1 is arranged so that the width W2 of the minor cutting edge 117 in the direction perpendicular to the first major face 112 does not exceed the width W1 of the first rake face elements 118a, 119a.

As described above, the first rake face elements 118a, 119a have a plane angle with the first major face 112, which constitutes an insert rake angle, now denoted $\phi$. Though the insert rake angle $\phi$ may be arranged to any value according to the cutting conditions of the insert, the insert rake angles in the second embodiment of the present invention are set so that the insert rake angle $\phi_{11}$ of the first rake face element 118b is greater than the insert rake angle $\phi_{12}$ of the first rake face element 119b, or $\phi_{11} > \phi_{12}$, in which, more specifically, $\phi_{11}$ is 83 degrees and $\phi_{12}$ is 79 degrees. However, the present invention is not limited to this arrangement of $\phi_{11} > \phi_{12}$, and also applicable to other arrangements including $\phi_{11} < \phi_{12}$ and $\phi_{11} = \phi_{12}$. When the insert rake angle $\phi$ of a rake face element is varied, the corresponding radial rake angle is subsequently varied.

Therefore, the cutting sharpness and strength of the major cutting edge, as a whole, can be adjusted according to the material of the work to be machined, by varying the insert rake face angles of the rake face elements.

It is also noted that, though in this second embodiment the insert 111 has four identical rake faces 114 arranged along the side margins of the major faces alternately adjoining the first and second major faces, the configuration of the side faces may be varied depending on the respective side where each side face is located.

The minor flank 115 is formed by chamfering the intersection of the second rake face elements 118b, 119b with either of the first and second major faces 112, 113, in which the plane angle at the intersection between the rake face element and the major face is less than 90 degrees. The chamfering angle or the plane angle of the minor flank 115 with the adjoining major face is set at a constant value of 45 degrees all the way along the minor flank 115. The width W2 of one end of the minor flank 115 adjoining the rake face elements 118a on the next side face, where the minor cutting edge 117 with a same width of W2 is formed, is kept smaller than the width W1 of the first rake face elements 118a, as described above, whereby the straightness of the minor cutting edge 117 is maintained.

On the other hand, if the width W2 of the minor cutting edge 117 is not less than the width W1 of the first rake face elements 118a, and subsequently the one end of the minor flank 115 adjoining the minor cutting edge 117 reaches the second rake face elements 118b, the minor cutting edge 117 results in being adversely bent along the intersection of the minor cutting edge 117 with the second rake face 118b.

The width of the minor flank 115 decreases as the minor flank 115 progresses toward and nearing the other end thereof opposite from the one end adjoining the minor cutting edge 117, and is arranged to end up with the other end in a form of pointed end or end with a width of zero at the obtuse angle corner C2 of the insert in accordance with the second embodiment. This arrangement for the other end having a zero width of the minor flank 115 being positioned at the obtuse angle corner C2 of the insert is done for an advantage in that the length of the major cutting edge element 116b can be kept as long as possible.

Alternatively, the other end of the minor flank 115 having the zero width may be positioned at a position P1 away from the obtuse angle corner C2 toward the minor cutting edge side end as discussed earlier with the first embodiment of the present invention, as shown in FIGS. 1 to 5, in which the above advantage is also maintained with respect to the length of the major cutting edge element. The insert 111 also has a round hole 120 so as to enable a clamping screw to be inserted through for clamping the insert 111 when mounted on a tool body.

Figure 27:
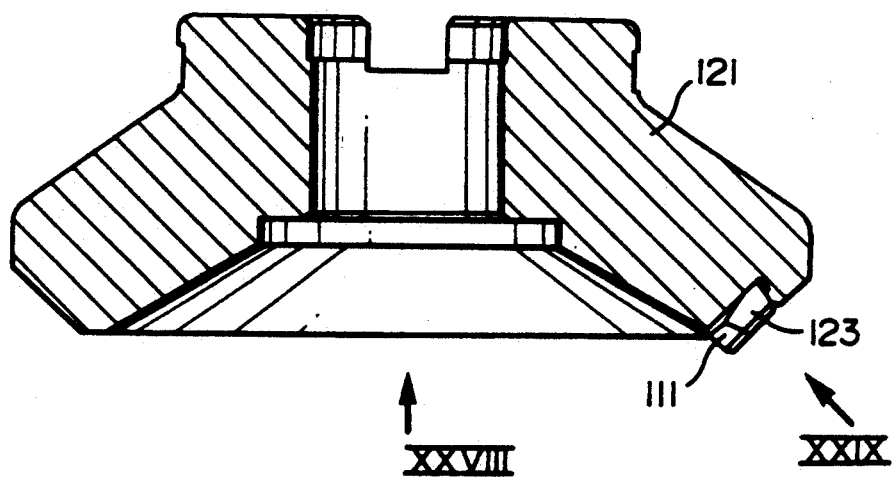
FIG. 27 is a cross-sectional view of a face milling cutter with the insert of FIG. 23 mounted on a mounting seat thereof.
Figure 28:
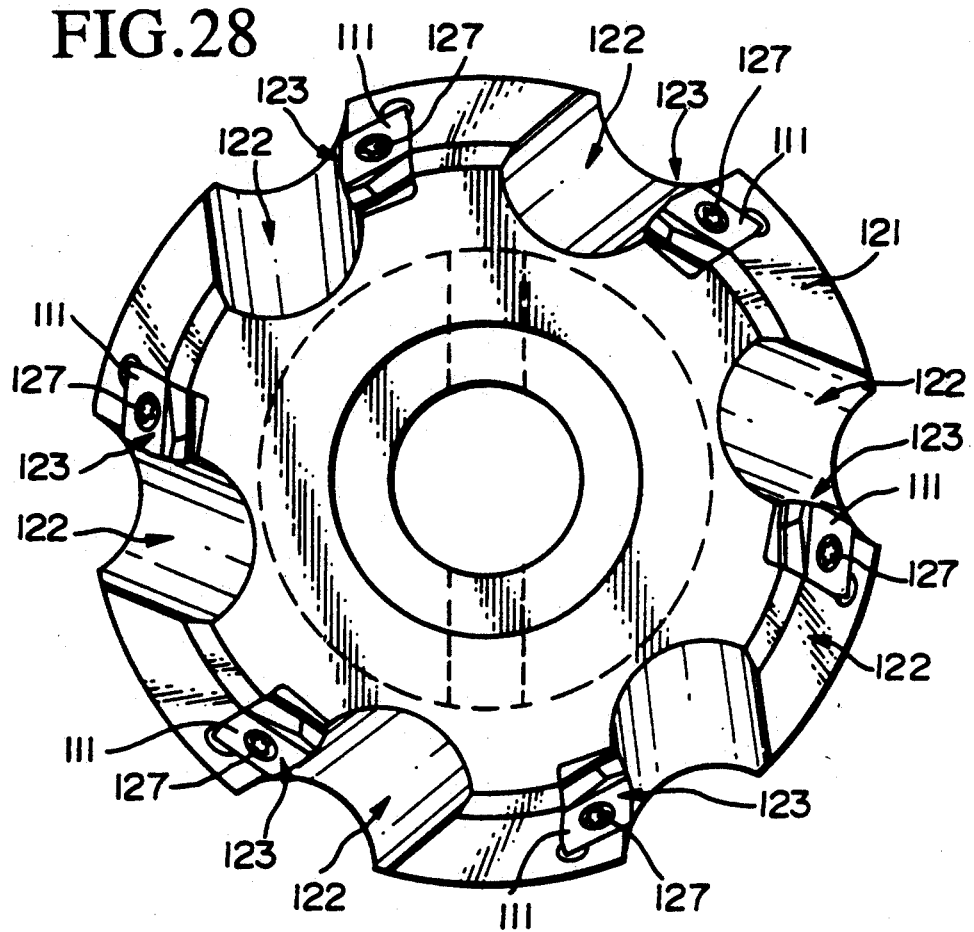
FIG. 28 is a front view of the cutter and the inserts of FIG. 27 as seen in the direction indicated by the arrow XXVIII in FIG 27.

Now, referring to FIGS. 27 to 33 a tool body 121 in accordance with a third embodiment of an aspect of the present invention will be described. As shown in FIGS. 27, 28, the tool body 121 has a similar configuration to the tool body 40 described in conjunction with the insert 20 of the first embodiment referring FIGS. 7 to 9. In that configuration, the tool body 121 has a substantially cylindrical shape, in which a plurality of chip pockets 122 having openings to the front end and to the external circumference of the tool body 121 are circumferentially disposed with a predetermined spacing at the front of the external circumference of the tool body 121.

Figure 29:
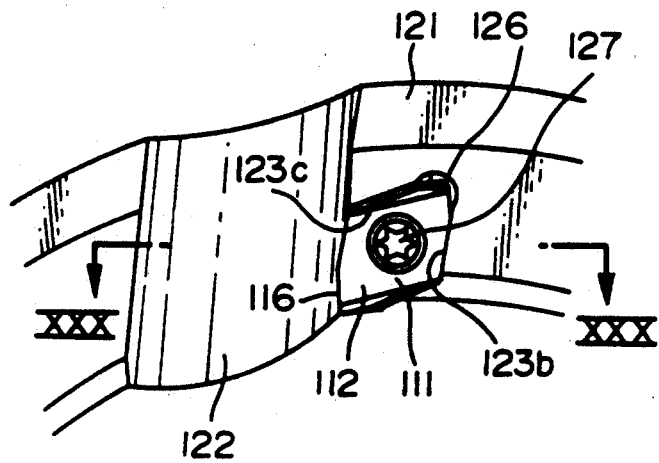
FIG. 29 is a partial side view of the cutter and the insert of FIG. 27 as seen in the direction indicated by the arrow XXIX in FIG. 27.
Figure 30:
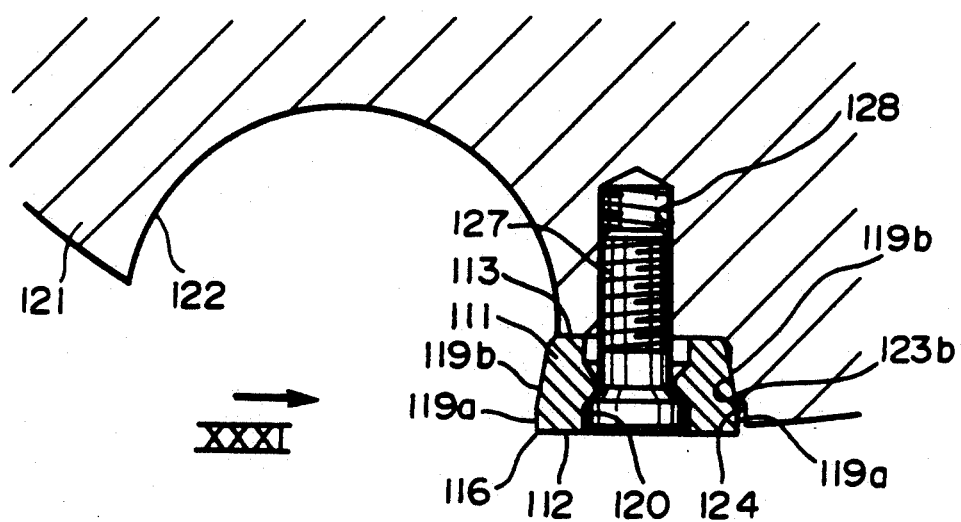
FIG. 30 is a partial cross-sectional view of a cutting tool in accordance with a third embodiment of the present invention with the insert of FIG. 23 mounted on a mounting seat thereof.

Disposed behind the chip pocket 122 in the direction of the rotation of the tool body 121 is an insert mounting seat 123 having openings to the front end of the external circumference of the tool body 121 and to the chip pocket 122. As shown in FIGS. 29, 30, the insert mounting seat 123 comprises a bottom or reference surface 123a facing the external circumference of the tool body 121 and side walls or abutment surfaces 123b, 123c intersecting the reference surface 123a and respectively facing toward the direction of the rotation of the tool body 121 and toward the front end of the tool body 121.

The side walls 123b, 123c are respectively formed to have a flat surface so that only the two second rake face elements 119b, 119b respectively constituted on the obtuse angle corner (C2) (FIG. 24) side of the two rake faces 114, 114 adjoining each other at the acute angle corner (C1) (FIG. 24) of the insert 111 are in contact with the side walls 123b, 123c. Thus, the other two second rake face elements 118b, 118b respectively constituted on the acute angle corner (C1) (FIG. 24) side of the two rake faces 114, 114 adjoining each other at the acute angle corner (C1) (FIG. 24) of the insert 111 do not come in contact with the side walls 123b, 123c.

As discussed earlier, the two second rake face elements 119b, 119b respectively constituted on the obtuse angle corner (C2) (FIG. 24) side of the two rake faces 114, 114 adjoining each other at the acute angle corner (C1) (FIG. 24) of the insert 111 have a plane angle of less than 90 degrees with a corresponding one of the major faces 112, 113 adjoining the first rake face elements 119a, 119a at the major cutting edge elements 116b, 116b, which in turn adjoin the second rake face elements 119b, 119b in a cascade. The first rake face elements 119a, 119a adjoining the second rake face elements 119b, 119b have a plane angle of 90 degrees with a corresponding one of the major faces 112, 113.

Accordingly, the side wall 123b includes a flat surface which is adapted to be in close contact with the second rake face element 119b and extends from one end at the intersection with the bottom surface 123a toward the other end of the side wall 123b at the opening to the front of the external circumference of the tool body 121. The side wall 123c includes a flat surface which is adapted to be in close contact with the second rake face element 119b and extends from one end at the opening to the front of the external circumference of the tool body 121 toward the other end of the side wall 123c at the intersection of with the bottom surface 123a.

The side walls 123b, 123c have recesses 124, 125 formed at a portion of the flat surface of the side walls that is adapted to be opposite to the rake face elements 119a, 119a so that the recess retreats away from the second rake face elements 119a, 119a. More specifically, the recess 124 in the flat surface of the side wall 123b is formed at an end portion adjoining the opening of the mounting seat 123 to the front of the external circumference of the tool body 121, and the recess 125 in the flat surface of the side wall 123c is formed at an end portion adjoining the intersection with the bottom surface 123a. The insert mounting seat 123 further has a corner recess 126 at the intersection between the side walls 123b and 123c so as to prevent interference of the acute angle corner (C1) (FIG. 24) of the insert 111 with the side walls 123b, 123c.

Figure 31:
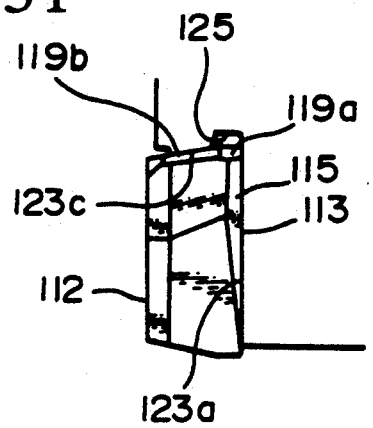
FIG. 31 is a side view of the cutting tool and the insert of FIG. 30 seen in the direction indicated by the arrow XXXI in FIG. 30.
Figure 32:
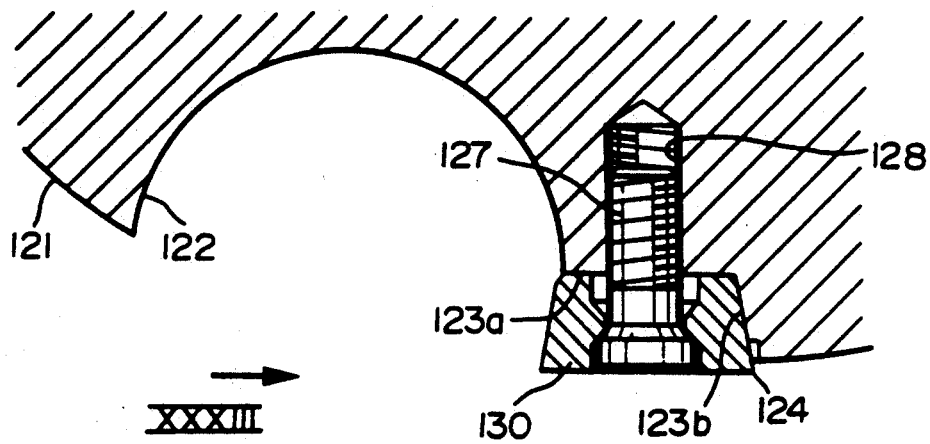
FIG. 32 is a partial cross-sectional view, similar to FIG. 30, of the cutting tool of FIG. 30 with a throwaway insert mounted on the mounting seat thereof, in which the insert has a rake face adjoining the major cutting edge and has a rake angle of less than 90 degrees.

When the insert 111 is mounted on the tool body 121 constructed as above, as shown in FIGS. 30, 31, a clamping screw 127 inserted through the hole 120 is screwed into a threaded hole 128 formed in the bottom surface 123a of the insert mounting seat 123 so that the second major face 123 of the insert 111 is brought in close contact with the bottom surface 123a of the insert mounting seat 123. Before finally clamping the insert 111 to the insert mounting seat 123, the insert 111 is abutted to the side walls 123b, 123c so that the two second rake face elements 119b, 119b are respectively in close contact with the side walls 123b, 123c for positioning.

Thus, the insert 111 is aligned to a predetermined position in the external circumference of the tool body 121, with a major cutting edge 116 and a minor cutting edge 117 adjoining an end of the major cutting edge 116 protruding toward the external circumference of the tool body and constituting cutting edges for an intended cutting. One of the side faces 114 constitutes a rake face facing the chip pocket 122, and the first major face 122 constitutes a flank facing toward the external circumference of the tool body 121, whereby a cutting tool for a throwaway insert in accordance with the embodiment of the present invention is provided.

Since the insert 111, according to the second embodiment of the present invention, has the first rake face elements 118a, 119a with a 90-degree plane angle formed so as to respectively adjoin the major cutting edge element 116a, 116b in a cascade, the included angle of the major cutting edge 116 becomes greater than in the case that an entire rake face 114 is formed in a single flat surface having a single plane angle of less than 90 degrees with the major face from the major cutting edge 116 to the minor flank 115, resulting in an improved strength of the major cutting edge. In addition, since the insert 111, according to the second embodiment of the present invention, has a second rake face elements 118b, 119b with a less-than-90-degrees plane angle formed so as to respectively adjoin the first rake face elements 118a, 119a in a cascade, the included angle of the major cutting edge 116 becomes smaller than in the case that an entire rake face 114 is formed in a single flat surface having a single plane angle of 90 degrees with the major face from the major cutting edge 116 to the minor flank 115, resulting in an improved cutting sharpness of the major cutting edge. Furthermore, since the insert 111, according to the second embodiment of the present invention, has the rake face 14 divided into a plurality, which is two in the second embodiment, of laterally disposed rake face elements, the strength and the cutting sharpness of the major cutting edge can be adjusted more precisely by varying the plane angle $\phi$ of the rake face elements 118b, 119b with the first major face 112 respectively and independently.

In the cutting tool for throwaway inserts, according to the embodiment of the present invention, an advantage is provided in that, since the insert mounting seat 123 of the tool body 121 is equipped with the recesses 124, 125, the tool body 121 can be commonly used either with the insert 111, according to the second embodiment, and with an insert 130 having at least one laterally disposed rake face element with a single less-than-90-degrees plane angle from the major cutting edge 116 to the minor flank 115.

Although the use of rake face elements 118a, 119a with a 90-degree plane angle can improve the strength of the major cutting edge of an insert according to the second embodiment of the present invention, the use of such rake face elements also could decrease the cutting sharpness to some extent compared with the case that an entire rake face 114 is formed in a single flat surface having a single plane angle of less than 90 degrees with the major face from the major cutting edge 116 to the minor flank 115. With these advantage and disadvantage taken into consideration, there is a desire to select a suitable insert mounted on a same tool body, depending on the condition of material to be machined, in a manner that: while the insert 111 according to the second embodiment of the present invention with an improved cutting edge strength is used for the cutting of substantially hard material such as die steel, and material with welded sections, an insert without rake face elements having a less-than-90-degrees plane angle may be used for cutting material having a less chance of breakage in the cutting edge such as mild steel so that the machining efficiency is further improved.

Figure 33:
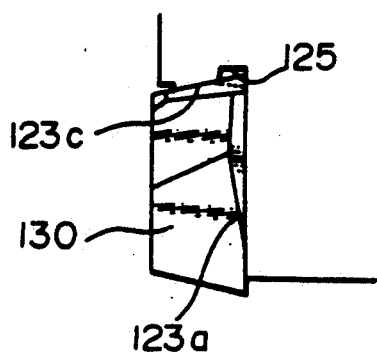
FIG. 33 is a side view of the cutting tool and the insert of FIG. 32 as seen in the direction indicated by the arrow XXXIII in FIG. 32.

However, if the side walls 123b, 123c are formed without the recess 124, 125 bur bent in conformity with not only the rake face elements 119b, 119b having a less-than-90-degrees plane angle with the major face but also the rake face elements 119a, 119a having a 90-degree plane angle with the major face, as shown in phantom lines in FIG. 33, then such side walls cannot come in close contact with an insert 130 having no rake face elements with a less-than-90-degrees plane angle in the case where the insert 130 is intended for use with such tool body since the rake face elements 119a, 119a interfere at the end thereof with such side walls 123b, 123c bent and having no recesses. This would result in two separate tool bodies being required, for an exclusive use to the inserts 111 and 130 respectively.

Contrary to the above, according to the embodiment of the present invention, the tool body 121 has the recesses 124, 125 on the side walls 123b, 123c having an unbent flat surface, whereby the interference described above between the rake face elements 119a, 119a and the side walls 123b, 123b are avoided. Therefore, according to the embodiment of the present invention, only a single tool body 121 will do even when inserts are intended to be used selectively depending on the characteristics of material to be machined, resulting in an easier tool maintenance and lower tool cost.

The second embodiment of the present invention has been discussed with an insert having the rake face 114 divided both in the lateral direction along the major cutting edge 116 (118, 119) and in a cascade in the direction away from the major cutting edge 116 (118a, 118b; 119a, 119b). However, the present invention is not limited to such arrangements, but is applicable to an insert only having the cascade division.

The second embodiment of the present invention also has been discussed with an insert having both laterally divided rake face element 118, 119 formed to have both the rake face elements 118a, 119a having a 90-degree plane angle, and the rake face elements 118b, 119b having a less-than-90- degrees plane angle. However, the present invention is not limited to such arrangements, but is applicable to an insert having the rake face elements with a 90-degree plane angle only on either of the rake face elements 118 or 119. In this case, if the rake face elements with a 90-degree plane angle are formed only on the rake face elements 119, then the rake face element 118 comprises only a single rake face element with a less-than-90-degrees plane angle in a cascade, whereby the minor cutting edge 117 is formed only on the single flat rake face, resulting in the straightness of the minor cutting edge being automatically secured.

The embodiments of the present invention have been discussed with inserts having a substantially rhombus-shaped configuration and two major cutting edges on each of the two major faces 21, 22; 112, 113. However, the present invention is not limited to such arrangements, but is applicable to inserts in which the face to be in contact with the mounting seat is limited to either one of the major faces 21 or 22, 112 or 113; or to inserts having different multilateral-shaped configuration such as rectangular, or triangle configuration and to inserts having more than two rake face elements.

Since the insert, according to the present invention, has rake face elements with a 90-degree plane angle formed so as to adjoin the major cutting edge, an increase in the included angle of the major cutting edge compared with an insert having an entire rake face formed to have a less-than-90-degrees plane angle, as described above. This results in an improved strength of the cutting edge, whereby breakage in the cutting edge being prevented when used for cutting substantially hard material such as die steel, and material with welded portions.

Furthermore, since the insert, according to the present invention, has rake face elements with a less-than-90-degrees plane angle formed so as to adjoin the rake faces with a 90-degree plane angle, the decrease in the cutting sharpness of the major cutting edge compared with an insert having an entire rake face formed to have a 90-degree plane angle.

In addition, since the tool body, according to the present invention, has a capability of having both inserts of the present invention and insert of the present invention less rake faces with a 90-degree plane angle mounted thereon, resulting in a higher versatility in a tool body.

What is claimed is:

1. A throwaway insert having a generally multilateral-shaped flat plate configuration, said insert comprising:

first and second generally multilateral-shaped major faces disposed parallel and opposite to each other, said first and second major faces each having side margins, a plurality of side faces, each extending between each of said side margins of said first major face and each of said side margins of said second major face oppositely disposed to said each of said side margins of said first major face, a major cutting edge constituted on at least one of intersections of said side faces with said first and second major faces, a rake face constituted on each of said side faces adjoining said major cutting edge, a minor flank formed along each remaining intersection of said side faces with said first and second major faces, said minor flank having first and second ends, said first end thereof intersecting with said rake face adjoining said major cutting edge, a minor cutting edge constituted along the intersection of said minor flank with said rake face adjoining said major cutting edge, each of said side faces constituting said rake faces and adjoining said major cutting edge further being formed so that at least one of said rake faces comprises a plurality of laterally disposed rake face elements disposed substantially along said major cutting edge and intersecting with each other so as to form a ridge having a convex cross-section, whereby said major cutting edge comprises a corresponding plurality of major cutting edge elements, said ridge extending to each corresponding intersection of said major cutting edge elements, said laterally disposed rake face elements being formed so that the plane angle of each of said laterally disposed rake face elements of one said rake faces with one of said major faces adjoining said major cutting edge is different from the corresponding plane angle of others of said literally disposed rake face elements of said one of said rake faces.

2. A throwaway insert according to claim 1, wherein said second ends of said minor flanks are disposed on the intersection of said side faces with said major face along which said minor flanks are constituted so that said said second ends are located within the length of the intersection between one end of the intersection where said minor cutting edge is constituted and the other end opposite thereto.

3. A throwaway insert according to claim 1, in which said laterally disposed rake face elements are formed so that said plane angle of one of said laterally disposed rake face elements of one of said rake faces with one of said major faces adjoining said major cutting edge is 90 degrees, and said corresponding plane angle of others of said laterally disposed rake face elements of said one of said rake faces is less than 90 degrees.

4. A throwaway insert according to claim 2, in which said laterally disposed rake face elements being formed so that said plane angle of one of said laterally disposed rake face elements of one of said rake faces with one of said major faces adjoining said major cutting edge is 90 degrees, and said corresponding plane angle of others of said laterally disposed rake face elements of said one of said rake faces is less than 90 degrees.

5. A throwaway insert having a generally quadrilateral-shaped flat plate configuration, said insert comprising:

a first and second generally quadrilateral-shaped major faces disposed parallel and opposite to each other, said first and second major faces each having side margins, first and second oppositely facing side faces extending between two opposite side margins of said first major face and two opposite side margins of said second major face, third and fourth oppositely facing side faces extending between remaining two side margins of said first major face and remaining two side margins of said second major face, a major cutting edge constituted along each of the intersections of said first major face with said first and second side faces and intersections of said second major face with said third and fourth side faces, a rake face being constituted on each of said side faces adjoining said major cutting edge, a minor flank formed along each remaining intersection of said side faces with said first and second major faces, said minor flank having a first and second ends, said first end thereof intersecting with said rake face adjoining said major cutting edge, a minor cutting edge constituted along the intersection of said minor flank with said rake face adjoining said major cutting edge, each of said side faces constituting said rake faces and adjoining said major cutting edge further comprising a plurality of laterally disposed rake face elements disposed substantially along said major cutting edge and having an intersection with each other so that said intersection constitutes a ridge having a convex cross-section, whereby said major cutting edge comprise a corresponding plurality of major cutting edge elements, said ridge extending to each corresponding intersection between said major cutting edge elements, said laterally disposed rake face elements being formed so that the plane angle of one of said laterally disposed rake face elements on one of said first and second side faces with said first major face is different from the corresponding plane angle of others of said laterally disposed rake face elements on said one of said first and second side faces.

6. A throwaway insert according to claim 5, wherein said second ends of each said minor flanks are disposed on the intersection of said side faces with said major face along which said minor flanks are constituted so that said second ends are located within the length of the intersection between one end of the intersection where said major cutting edge is constituted and the other end opposite thereto.

7. A throwaway insert according to claim 5, in which said laterally disposed rake face elements are formed so that said plane angle of one of said laterally disposed rake face elements of one of said rake faces with one of said major faces adjoining said major cutting edge is 90 degrees, and second corresponding plane angle of others of said laterally disposed rake face elements of said one of said rake faces is less than 90 degrees.

8. A throwaway insert according to claim 6, in which said laterally disposed rake face elements are formed so that said plane angle of one of said laterally disposed rake face elements of one of said rake faces with one of said major faces adjoining said major cutting edge is 90 degrees, and said corresponding plane angle of others of said laterally disposed rake face elements of said one of said rake faces is less than 90 degrees.

9. A throwaway insert having a generally multilateral-shaped flat plate configuration, said insert comprising:

first and second generally multilateral-shaped major faces disposed parallel and opposite to each other, said first and second major faces having side margins, a plurality of side faces, each extending between each of said side margins of said first major face and each of said side margins of said second major face oppositely disposed to each of said side margins of said first major face, a major cutting edge constituted on at least one of the intersections of said side faces with said first and second major faces, a rake face constituted on each of said side faces adjoining said major cutting edge, a minor flank formed along each remaining intersection of said side faces with said first and second major faces, said minor flank having first and second ends, said first end thereof intersecting with said rake face adjoining said major cutting edge, a minor cutting edge constituted along the intersection of said minor flank with said rake face adjoining said major cutting edge, each of said side faces constituting said rake faces and adjoining said major cutting edge further being formed so as to define first and second rake face elements in a cascade, said first rake face element adjoining said major cutting edge, said second rake face element adjoining said first rake face element and extending opposite from said major cutting edge, said first and second rake face elements further being formed so that at least one of said rake faces having said first and second rake faces extending oppositely to said major cutting edge further comprises a plurality of laterally disposed rake face elements disposed substantially along said major cutting edge and intersecting with each other so as to form a ridge having a convex cross-section, whereby said major cutting edge comprises a plurality of major cutting edge elements, said ridge extending to each corresponding intersection of said major cutting edge elements, said rake face elements being formed so that at least a pair of said first and second rake face elements divided laterally by said ridge comprise said first rake face element having a plane and of 90 degrees thereof and said second rake face having a plane angle less than 90 degrees thereof with said major face adjoining said major cutting edge.

10. A throwaway insert according to claim 9, in which each of said minor cutting edges is formed only on said intersection of said minor flank with said rake face element adjoining said major cutting edge.

11. A throwaway insert according to claim 9, in which each of said minor cutting edges is formed only on said intersection of said minor flank with said rake face element adjoining said major cutting edge.

* * * * *